J. G. ERNST.
FIRE HOOK.
No. 16,329.  Patented Jan. 6, 1857.
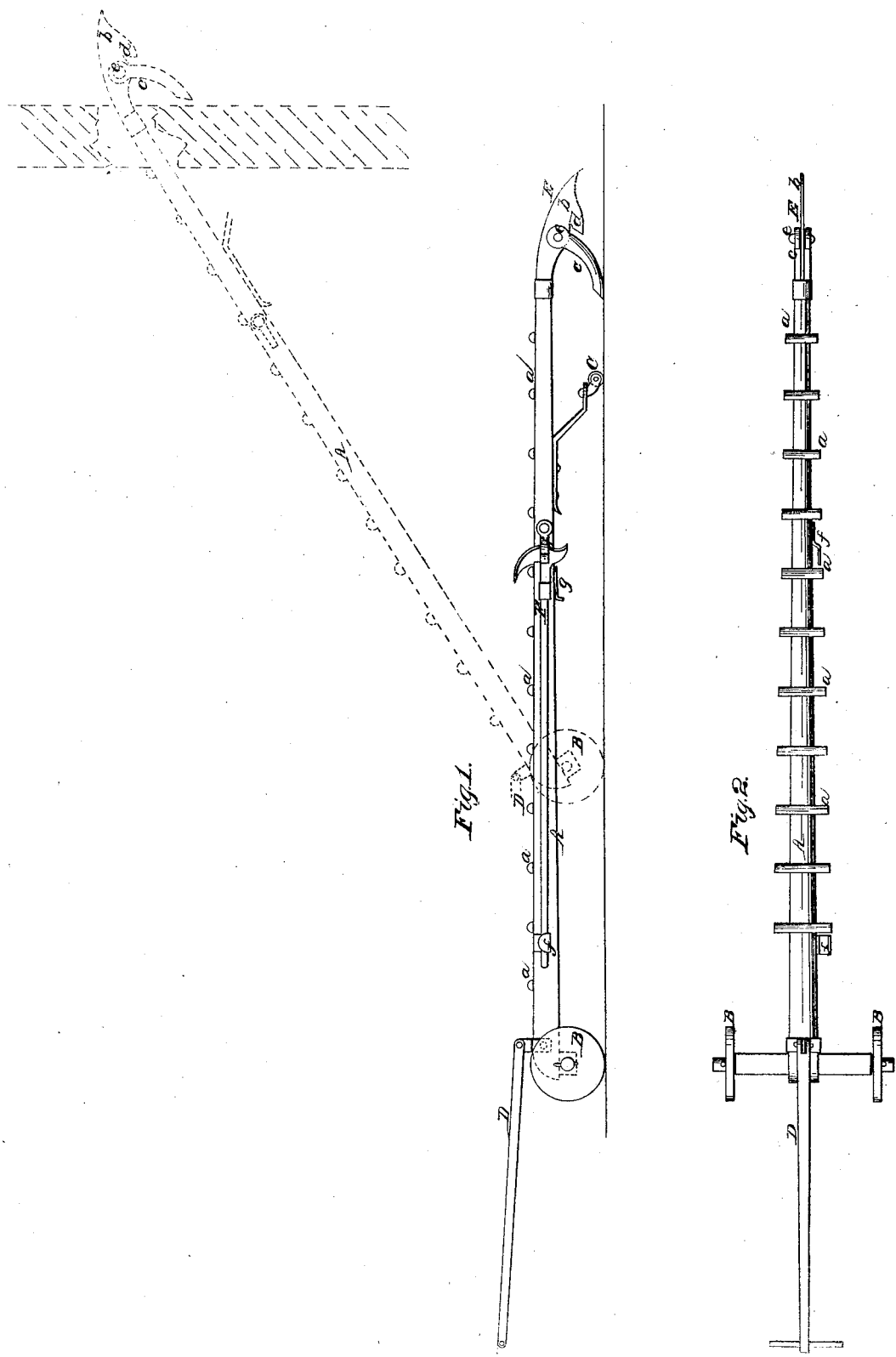

UNITED STATES PATENT OFFICE.

JOHN G. ERNST, OF HARRISBURG, PENNSYLVANIA.

FIRE-HOOK.

Specification of Letters Patent No. 16,329, dated January 6, 1857.

*To all whom it may concern:*

Be it known that I, JOHN G. ERNST, of Harrisburg, in the county of Dauphin and State of Pennsylvania, have invented a new and Improved Fire-Hook; and I do hereby declare that the following is a full, clear, and exact description of the same, reference being had to the annexed drawings, making a part of this specification, in which—

Figure 1, is a side view of my improvement. Fig. 2, is a plan or top view of ditto.

Similar letters of reference indicate corresponding parts in the two figures.

My invention consists in the peculiar construction of the hook as will be hereinafter fully shown and described, whereby the hook is rendered much more effective than those in general use.

To enable those skilled in the art to fully understand and construct my invention, I will proceed to describe it.

A, represents a beam or rod constructed of wood and made in taper form. The beam or rod has rounds $a$, attached to it transversely at suitable distances apart, the rounds enabling persons to ascend the beam or rod when elevated. The thick end of the rod or beam is supported by two wheels B, B, the end of the beam resting upon the axle of the wheels. The opposite end of the beam is supported by a swivel wheel C. A pole D, is attached to the thick end of the beam and a rope is attached to the pole, so that the apparatus may be readily moved or drawn from place to place. To the smaller end of the beam A, a hook E, is attached. This hook is formed of two parts $b$, $c$. The part $b$, is firmly secured to the end of the beam A. The end of the part $b$, is pointed and a projection $d$, is formed on its lower side, a suitable distance from its end, as shown clearly in Fig. 1. To the part $b$, the part $c$, is attached by a pivot $e$. The part $c$, is of somewhat curved form and is allowed to swing freely on its pivot $e$. The part $c$, swings inward or toward the thick end of the beam but is prevented from swinging outward beyond a right angular position with the part $b$, on account of the projection $d$, on said part.

F, represents a small hook which is fitted in loops $f$, attached to one side of the beam A.

The implement is used in the following manner: The beam A, is raised by means of the hook F, the hook being placed against projections or plates $g$, on the underside of the beam A, and when the hook is raised to the proper point it is forced through the wall as shown in red, Fig. 1, the point of the part $b$, making the perforation. When the part $b$, is forced through the wall, the part $c$, by its own gravity assumes a vertical position and of course prevents the hook from being withdrawn from the aperture and consequently the wall may be torn down or leveled with the greatest facility.

The above implement has long been required. It will form an efficient and cheap device and the walls of burned buildings may be leveled without that danger that now exists owing to the short hand hooks and poles employed for the purpose.

Having thus described my invention, what I claim as new and desire to secure by Letters Patent, is—

The hook E, constructed of the two parts $b$, $c$, and attached to the beam A, which is provided with rounds $a$, and mounted upon wheels, substantially as described, for the purpose set forth.

JOHN L. ERNST.

Witnesses:
HENRY WOLZ,
C. A. SNYDER.